H. HOUSE.
MEANS FOR ABSORBING ROAD SHOCKS ON VEHICLE WHEELS.
APPLICATION FILED JULY 30, 1912.
1,128,140. Patented Feb. 9, 1915.
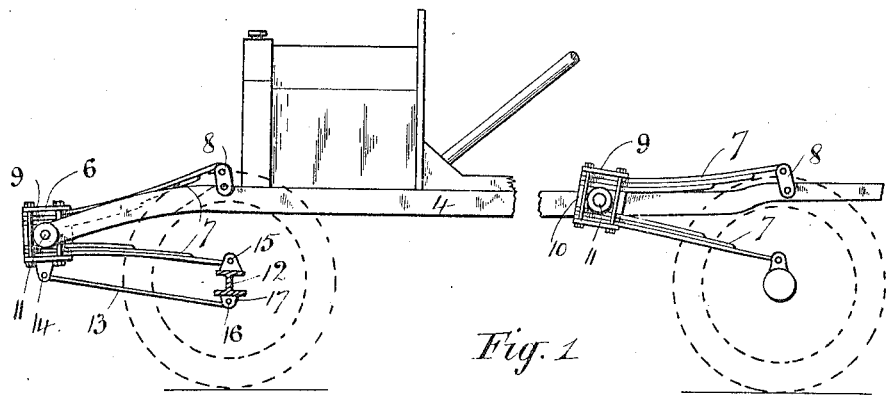
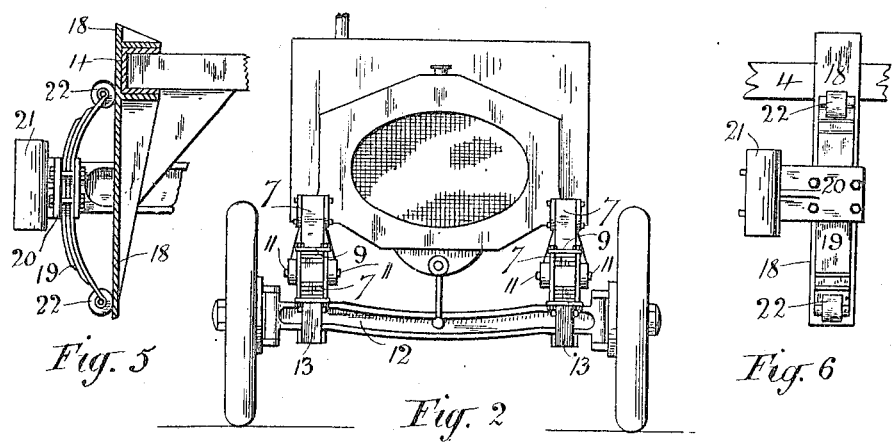
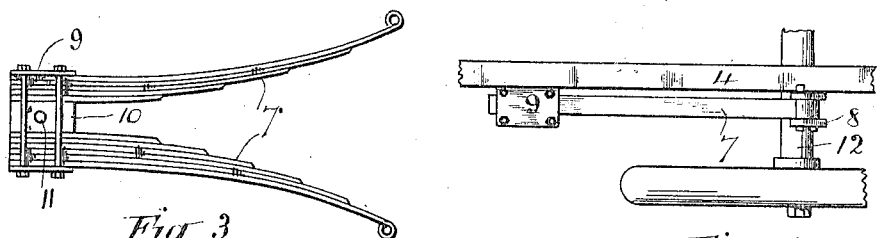
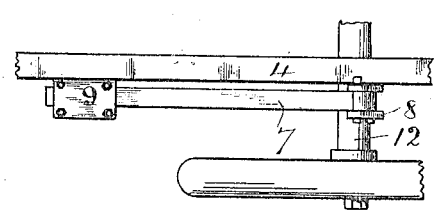
Inventor
H. House

UNITED STATES PATENT OFFICE.

HERMAN HOUSE, OF MELBOURNE, VICTORIA, AUSTRALIA.

MEANS FOR ABSORBING ROAD-SHOCKS ON VEHICLE-WHEELS.

1,128,140.

Specification of Letters Patent.

Patented Feb. 9, 1915.

Application filed July 30, 1912. Serial No. 712,306.

*To all whom it may concern:*

Be it known that I, HERMAN HOUSE, a subject of the King of Great Britain, residing at Flinders Buildings, Flinders street, Melbourne, Victoria, Australia, have invented certain new and useful Improvements in Means for Absorbing Road-Shocks on Vehicle-Wheels, of which the following is a specification.

My invention refers to means for absorbing road shocks received on the wheels of vehicles and is particularly applicable to motor driven cars and other analogous conveyances.

The invention is at once simple of construction easy of attachment and efficient in operation.

In carrying into effect my invention, I utilize leaf springs which I mount on the frame of the car or other vehicle in a special manner. I prefer to use two springs to each vehicle wheel and connect them together at one end in a common mounting adapted to freely move about a pin in the frame of the vehicle. The other ends of the springs will be respectively loosely attached the one to a link or shackle on the said frame and the other to the wheel axle.

The invention is applicable to most wheeled vehicles where the body is supported on springs but as it is more particularly intended for use on motor driven vehicles I have, in order that the invention may be fully understood, illustrated the same as applied to such vehicles in the accompanying drawings, in which, Figure 1 is a side elevation of part of the chassis of a motor vehicle with my arrangement of springs attached. Fig. 2 is a front view of same. Fig. 3 shows a detail illustrating my method of connecting up two springs, and Fig. 4 is a plan of part of the left hand rear wheel and springs. Fig. 5 illustrates mechanism to minimize extreme side sway of the car body, and Fig. 6 is a side elevation of the same.

On the chassis frame 4 at each side near to and forwardly of the front axle of the vehicle is a bracket 6 in each of which is a mounting for the springs 7, while the rear wheel's springs may be mounted directly on the frame in their pivotal support as shown in Fig. 1.

One end of the uppermost spring is loosely attached to the link or shackle 8 which is itself attached in a like manner to the frame. The other end of the said spring is held in a clamp or holdfast 9 in which is a distance piece or block 10 between the thick ends of the upper and lower springs 7. The distance piece 10 is further utilized as a bearing for the carrying pin 11 that is held in the vehicle frame and about which the block and the springs 7 may freely move within certain limits. The lowermost of the springs 7 is likewise rigidly held in the clamp 9 at one of its ends as shown, while its other end is attached to a convenient mounting upon the wheel axle 12. It will thus be seen that while each upper spring 7 inclines from its thick end upwardly toward the vehicle frame each lower spring extends downwardly and rearwardly from its thick end to its axle connection thereby assisting the wheel to surmount obstacles and tending to reduce the shock arising from the same.

When a wheel receives a shock the lower spring will, while allowing the wheel to back up from as well as to surmount the obstruction, describe an arc about the pin 11, and as the upper and lower springs are rigidly held together in the clamp 9 it follows that the movements of the lower spring will be more or less conveyed through the clamp mounting to the upper spring which will assist in absorbing the shock received by the lower spring from the wheel. On the other hand, should the shock come from the direction of the car body it will be more or less absorbed by the uppermost spring and any balance will be transferred through the block 10 to the lower spring.

For the purpose of overcoming the tendency of the axles 12 to revolve and to stay the same in their proper positions I may extend the brackets 6 downward for a short distance or may provide a lug upon the members 9 to provide a bearing or support for the torque rods 13 the other extremities of which are held in brackets depending from the wheel axles. These rods 13, of which there may be one to each wheel should preferably be approximately parallel with the lower springs and are loosely held in their mountings.

It will be observed that the distance between the axis of the pin 11 on the frame 4 and the pin 14 on the extension is approximately the same as the distance between the spring tip mounting 15 on the axle and the pin 16 in the depending bracket 17, and that the distance between 11 and 15 is approximately the same as the distance between 14 and 16.

I have, in the drawing, shown the torque rods only in connection with the front wheels, but they may be used with the rear wheels also if the vehicle carried by the wheels is not provided with its own torque bar or its equivalent, such for instance as lateral stays between a point near the axle of one wheel and a point on the frame at the opposite side near to the spring block mounting.

It will be observed that the uppermost of the springs 7 is attached to the vehicle frame at two points while the lower spring is on the axle at its tip and at its thick end is held in the rocking member 9 that also holds the thick end of the top spring. The weight of the car thus directly comes upon the four spring sytems but any shocks on the wheels that tend to straighten the lower springs are conveyed upward through the rocking members 9 to the upper springs.

When the car body rocks from side to side there will be a tendency to a twisting strain upon the lower springs 7, more particularly at their tips. In order to minimize this action I propose to mount on or near either end of the wheel axles a vertically disposed bow spring in the ends of which are rollers that bear upon a vertical plate secured to the vehicle frame. The tendency of the car body to roll sidewise will thereby be corrected and its movement and pressure upon its carrying springs be more vertical.

While I have not shown the above mechanism in the principal Figs. 1 and 2 it is thought that this part of the invention will be fully understood if reference be made to the special Figs. 5 and 6, wherein the vertical plate 18 is held on the vehicle frame 4 at convenient points on each side of the car, such as near to each wheel. The bow spring 19 is securely held in the bracket 20 which may be formed on the steering swivel 21 and on each end of the spring 19 is a roller 22 which bears on the plate 18 and moves over it in a vertical path according to the movements of the car body. The springs 19 placed thus at each side of the frame will guide the vertical movements of the body and prevent extreme side sway of the same in the spring suspension, arranged in accordance with this invention.

Having now described my invention what I claim as new and desire to secure by Letters Patent is:—

1. In shock absorbing means of the kind indicated, means for keeping the car body upright and for minimizing the side play of the same which consists of the combination with the vehicle frame of a vertical plate or plates depending from the frame at each side thereof, a vertically disposed bow spring upon a wheel axle or other mounting apart from the frame and rollers upon the tips of the springs bearing on a plate, as set forth.

2. In a shock absorber, the combination of a vehicle frame, an axle, a link pivoted to the frame, a rocking member pivoted to the frame, a load bearing leaf spring having one end connected to the axle and the other end to the rocking member, and a second load bearing leaf spring extending from the rocking member and pivoted at its free end to the free end of the link.

3. In shock absorbing means of the class described, the combination of a vehicle frame, an axle, a rocking member pivoted to the frame beyond the axle, a leaf spring secured to the rocking element and extending therefrom, a link pivoted at its ends to said leaf spring and the frame, and a second leaf spring secured to the rocking element at one end and pivoted at its opposite end to the axle.

4. In shock absorbing means of the class described, the combination of a vehicle frame, an axle, a rocking member, an upper leaf spring secured to the rocking member and extending rearwardly therefrom, a longitudinal rocking connection between the rear end of said leaf spring and the frame, and a leaf spring secured to the under side of the rocking member and extending rearwardly therefrom, the rear end of the lower leaf spring being secured to the axle.

5. The combination with a vehicle frame and an axle, of a pair of leaf springs connected at one end and diverging at the other, means for pivotally connecting the connected ends of the springs to the frame, the extremity of the diverging end of one spring being secured to the axle, and a connection for pivoting the extremity of the diverging end of the other spring to the frame, the said latter connection including means for permitting a slight lateral movement of the extremity of the spring.

6. The combination with a vehicle frame and an axle, of a pair of unilateral graduated leaf springs having their thickened portions connected pivotally direct to the frame, the tip of one spring being connected to the axle and the tip of the remaining spring being connected to the frame above said axle to permit a slight lateral movement of the end of said remaining spring.

In witness whereof I have hereunto signed my name in the presence of two subscribing witnesses.

HERMAN HOUSE.

Witnesses:
M. NEWTON,
M. ALLAN.